United States Patent
Reniau

(10) Patent No.: US 6,945,496 B2
(45) Date of Patent: Sep. 20, 2005

(54) DEVICE FOR ASSEMBLY OF LANDING GEAR ON AN AIRCRAFT STRUCTURE

(75) Inventor: Grégory Reniau, Touruefeuille (FR)

(73) Assignee: Airbus France, Toulouse Cedex (FR)

( * ) Notice: Subject to any disclaimer, the term of this patent is extended or adjusted under 35 U.S.C. 154(b) by 83 days.

(21) Appl. No.: 10/456,172

(22) Filed: Jun. 5, 2003

(65) Prior Publication Data

US 2005/0116097 A1    Jun. 2, 2005

(30) Foreign Application Priority Data

Jun. 10, 2002   (FR) .................................. 02 07086

(51) Int. Cl.[7] ............................................. B64C 25/10
(52) U.S. Cl. ............................. 244/100 R; 244/102 R
(58) Field of Search ...................... 244/100 R, 102 R, 244/104 R, 103 R, 131; 308/238, 321

(56) References Cited

U.S. PATENT DOCUMENTS 2,747,817 A * 5/1956 Saulnier ...................... 244/50
4,083,545 A * 4/1978 Herbenar ................... 267/266
6,273,364 B1   8/2001 Tizac et al. ................. 244/100

FOREIGN PATENT DOCUMENTS

EP    0 899 191    3/1999 ..................... 25/20
FR    2 793 210   11/2000 ..................... 25/4

* cited by examiner

Primary Examiner—Galen Barefoot
(74) Attorney, Agent, or Firm—Thelen Reid & Priest, LLP

(57) ABSTRACT

Device for assembly of landing gear on an aircraft structure.

The device comprises two segments (14a, 14b) of the shaft aligned along the same center line and fixed to a fitting of the landing gear, two support devices (10a, 10b) fixed to the aircraft structure, two ball joint balls (12a, 12b) installed between the corresponding shaft segments and the support devices and a tension bar (24) connecting the two support devices. One (10a) of the two support devices, preferably turned towards the outside of the aircraft, is deformable by bending or articulation. Advantageously, the tension bar bears on the bearing balls (20a, 20b) and the guide rings are placed between the bar and the shaft segments, to prevent vibrations.

5 Claims, 1 Drawing Sheet

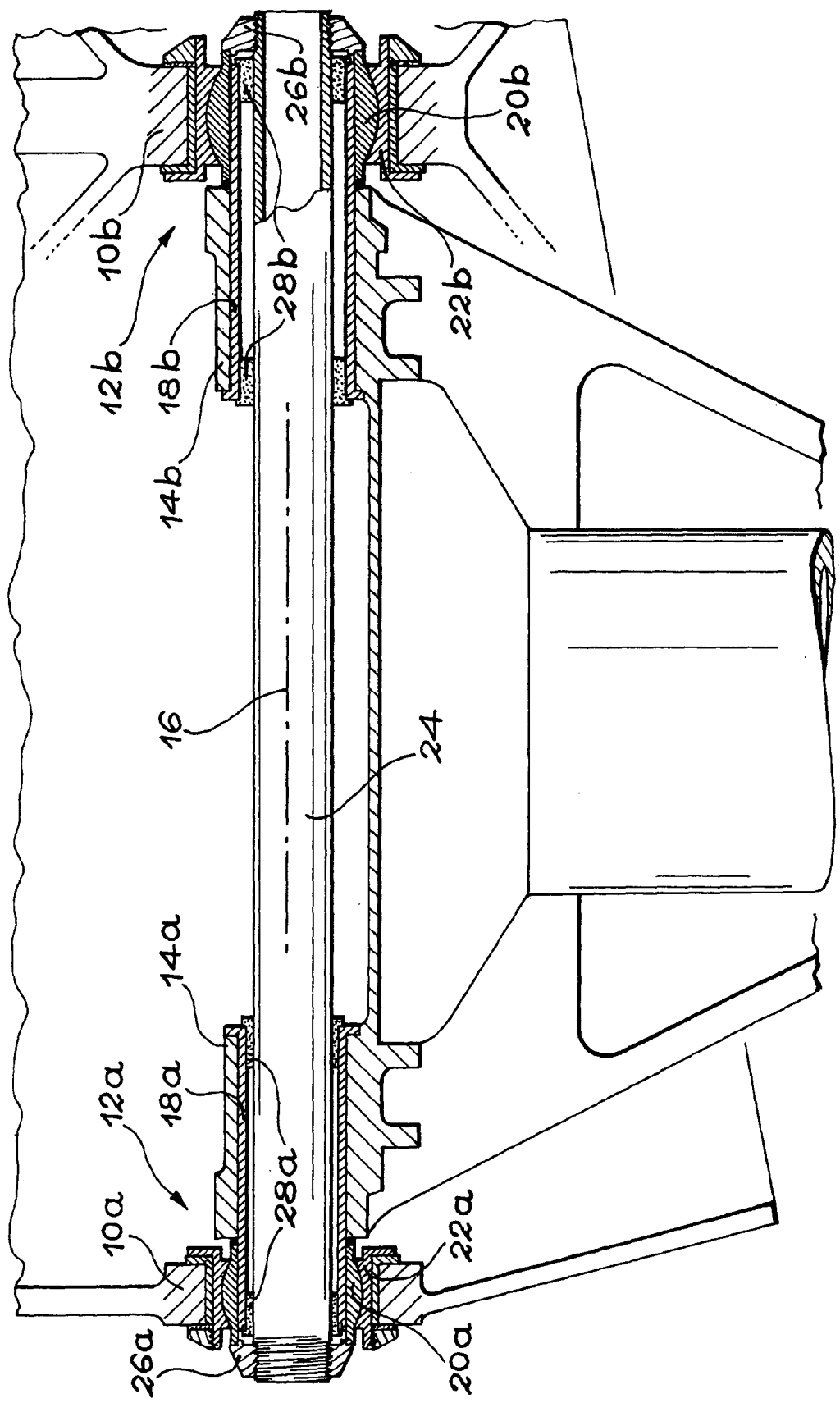

DEVICE FOR ASSEMBLY OF LANDING GEAR ON AN AIRCRAFT STRUCTURE

CROSS-REFERENCE TO RELATED APPLICATION

This application claims priority to French application no. 02 07086, filed on Jun. 10, 2002, entitled: "Device For Assembly of Landing Gear on an Aircraft Structure" and was not published in English.

TECHNICAL FIELD

This invention relates to a device for assembly of landing gear on an aircraft structure along a rotating shaft enabling the landing gear to pivot between a flight position in which the landing gear is retracted into the fuselage and a landing position in which the landing gear is projecting out of the fuselage.

More precisely, the assembly device according to the invention is designed to transmit all forces applied to the landing gear to the aircraft structure, so that the forces exerted along the geometric axis of the rotating shaft of the landing gear, subsequently called "axial forces" are all transmitted to the aircraft structure at a single end of the said rotating shaft, and that only compression forces are applied to the landing gear.

The invention may be applied to all aircraft.

STATE OF THE ART

Aircraft landing gear, such as landing gear placed under the fuselage, is usually assembled under the aircraft structure using a number of rotating shafts, the ends of which are fitted in bearing blocks. These bearing blocks transmit axial forces to the aircraft structure, and forces applied perpendicular to the center lines of the said rotating shafts, subsequently called "radial forces".

As illustrated in FIG. 1 in document FR-A-2 793 210, it is known how to install a rotating shaft of landing gear under the fuselage on wide body aircraft such as the "Boeing 747" in an outer bearing block linked directly to the fuselage, and an inner bearing installed in a ventral beam that forms an integral part of the fuselage. More precisely, the rotating shaft is then fixed in translation in the outer bearing block. Thus, all axial forces are transmitted to the outer bearing block while radial forces are symmetrically distributed between the two bearing blocks.

This arrangement has the disadvantage that part of the fuselage on which the outer bearing block is installed needs to be reinforced.

Furthermore, use of the reverse arrangement in which axial forces are transmitted to the inner bearing block is also unacceptable. This would require reinforcement of the attachment through which the bearing block is fixed to the ventral beam. It would also mean that tension and compression forces would be applied alternately onto the landing gear fitting, while it is desirable that only compression forces should be applied to this fitting.

A rotating shaft installed in this way also has the disadvantage that it is asymmetric, such that two different dies will have to be used to make the shafts corresponding to the right and left landing gear for the aircraft.

Finally, since the two bearing blocks are fixed, assembly is difficult if the two bearing blocks are not perfectly aligned.

Another known assembly is illustrated in FIG. 2 in document FR-A-2 793 210. In this case, the ends of the rotating shaft are symmetrically supported by two ball joint bearing blocks. The outer ball joint bearing block resists axial forces applied outwards and the inner ball joint block resists axial forces applied inwards. As with the previous assembly, radial forces are distributed between the two bearing blocks.

This assembly has the advantage that it is symmetric and easy to assemble, unlike the previous assembly.

However, application of all axial forces to either one of the ball joint bearing blocks depending on whether they are in the inwards or outwards direction, requires reinforcement to the attachment on which the inner bearing block is fixed and reinforcement of the part of the fuselage on which the outer bearing block is fixed. Therefore, this assembly technique cannot be used when the landing gear is installed far from the center line of the aircraft, when the space between the compartment into which the landing gear fits and the outer part of the fuselage is so small that the aircraft structure on the outer side of the fuselage is not stiff enough to resist the axial forces.

Document FR-A-2 793 210 describes a device for assembly of a landing gear capable of transmitting axial forces to the aircraft structure through only one of the two bearing blocks supporting the rotating shaft. Two half rotating shafts are installed in the inner and outer parts of the aircraft structure through ball joint bearing blocks. A tension bar called a "force resistance" bar is fitted inside the half shafts and its ends are fixed to the inner and outer parts of the aircraft structure using flanges and nuts.

With this arrangement, axial forces in the outwards direction are transmitted to the outer structure of the aircraft by compression of the landing gear fitting, which bears on the outer bearing block ball joint. However, since the outer structure is fixed to the tension bar by means of flanges and nuts, the said axial forces are resisted by the tension bar and applied to the inner structure of the aircraft through the inner bearing block.

Therefore, this arrangement enables all axial forces applied to the landing gear to be resisted on the inner bearing block, while only compression forces are applied to the fitting of the said landing gear.

However, there can be some disadvantages when axial forces are high and when the structure that holds the outer bearing block in place is not sufficiently rigid.

Thus, axial forces can cause an elongation of the tension bar by a non-negligible length $\Delta L_1$. The consequence of this elongation is that the outer structure of the aircraft also moves by a distance $\Delta L_1$ towards the outside of the fuselage.

At the same time, the inner structure of the aircraft deforms under the effect of forces applied to the inner bearing block that causes this bearing block to displace by a distance $\Delta L_2$ towards the outside of the fuselage. This displacement is additional to the previous displacement and therefore increases deformation of the outer structure of the aircraft. Therefore, the assembly device described in application FR-A-2 793 210 is not sufficient when axial forces are high.

Furthermore, when this device according to prior art is subjected to high axial forces in the inwards direction, these forces are applied to the inner structure of the aircraft through the inner bearing block. The inner structure is then deformed under the effect of these forces, which causes a displacement of the inner bearing by a distance $\Delta L_3$ towards the inside of the fuselage. The outer structure is entrained by the same distance $\Delta L_3$ towards the inside of the aircraft through the tension bar. The device then causes damage to the outer fitting, by unnecessarily causing its deformation.

When a landing gear assembly device like that described in document FR-A-2 793 210 is used and when axial forces are high, the outer structure of the aircraft is subjected to displacements $\Delta L_1 + \Delta L_2$ towards the outside of the aircraft, or displacements $\Delta L_3$ towards the inside of the aircraft, along the center line of the rotating shaft of the landing gear. This causes alternating bending of the said outer structure and consequently risks of fatigue to this structure.

Furthermore, due to the fact that the tension bar is built into the aircraft structure at its two ends using nuts and flanges, this introduces harmful building-in moments at the flanges if this structure is deformed, causing misalignment of the bearing blocks.

Furthermore, due to the fact that the tension bar is fixed at both ends only without any guidance along its length, which is almost 2 meters, it may be subjected to vibrations that can cause damage to it. Note that the reduction of these vibrations that would be achieved by adding guide rings between the tension bar and the two half shafts would have the disadvantage of preventing free movement of the two half shafts at the bearing blocks.

PRESENTATION OF THE INVENTION

The invention is related to a landing gear assembly device on an aircraft structure that forms an improvement to the device described in document FR-A-2 793 210 and for which the innovative design solves the different problems that arise with existing devices, and in particular it transmits axial forces to only one of the two parts of the aircraft structure, even when these forces are high enough to cause deformations.

According to the invention, this result is obtained using a landing gear assembly device on an aircraft structure, the device comprising two segments of the shaft aligned along the same center line and fixed to a fitting of the landing gear, two support devices fixed to the aircraft structure, two ball joint cages fixed in each of the said corresponding support devices, two ball joint balls installed in the ball joint cages and fixed to each of the corresponding shaft segments and a tension bar connecting the two support devices along the said center line, characterized in that one of the two support devices is deformable in the direction of the said center line and in that the tension bar connects these support devices through its ends that bear on the bearing balls, exerting a tension force between these bearing balls.

Since one of the two support devices is deformable along the common center line of the segments of the shaft, this support device can follow the displacements of the corresponding bearing block imposed by the tension bar, without causing an uncontrolled bending phenomenon and therefore causing fatigue on the structure.

Furthermore, since the tension bar bears on the balls of the bearing joint balls through its ends, so as to exert a tension force between them, there is no building-in moment at the ends of the tension bar due to misalignment of the bearing blocks caused by deformations of the aircraft structure due to the combined effect of axial and radial forces.

If such a device is used on landing gear offset laterally with respect to the longitudinal axis of the aircraft, the deformable support device is preferably the device that is offset towards the outside of the aircraft more than the other support device.

In the preferred embodiments of the invention, the support device that is deformable along the center line common to the shaft segments is a flexible articulated partition.

Also advantageously, guide rings are fixed in the ends facing the two shaft segments and the tension bar is installed so that it is adjustable by sliding inside the said rings. These rings guide the tension bar which has the effect of limiting vibrations.

BRIEF DESCRIPTION OF THE DRAWINGS

We will now describe one preferred embodiment of the invention as an illustrative and non-limitative example with reference to the attached drawings in which the single FIGURE is a sectional view that shows an assembly device according to the invention, along its center line.

DETAILED DESCRIPTION OF A PREFERRED EMBODIMENT OF THE INVENTION

As shown in the single FIGURE, the device according to the invention is used for the assembly of landing gear on an aircraft structure. More precisely, the embodiment described relates to the case of landing gear installed on the sides under the aircraft fuselage.

The assembly device according to the invention comprises two support devices 10a, 10b fixed to the aircraft structure. In the example described, the support device 10a is offset towards the outside of the aircraft, in other words it is further from the longitudinal axis of the aircraft than the support device 10b. Consequently, the support devices 10a and 10b are called the "outer support device" and the "inner support device" respectively in the remainder of the text.

The support devices 10a and 10b are used to assemble the landing gear by means of two ball joint bearing blocks 12a and 12b. More precisely, each of the ball joint bearings 12a, 12b supports a segment of a shaft or half shaft 14a, 14b fixed to a fitting of the landing gear. The two shaft segments 14a, 14b, form part of the assembly device according to the invention. They have a common center line identified by the reference 16 in the FIGURE and oriented along a direction transverse to the aircraft.

As shown in the FIGURE, the two shaft segments 14a and 14b are hollow and each of them is fitted onto a bearing liner 18a, 18b. The closest ends of the bearing liners 18a, 18b are fitted with collars that bear on the end faces opposite the shaft segments 14a and 14b. The opposite ends of the bearing liners 18a and 18b project outside the shaft segments 14a, 14b to support the ball joint balls 20a, 20b that form an integral part of the ball joint bearing blocks 12a, 12b.

The ball joint balls 20a, 20b themselves are assembled in the ball joint cages 22a, 22b fixed in the corresponding aligned holes formed in the support devices 10a, 10b.

According to the invention, the assembly device also includes a tension bar 24 that connects the support devices 10a and 10b along the center line 16 of the shaft segments 14a and 14b. More precisely, the tension bar 24 passes through the bearing liners 18a and 18b over their entire length, to bear on the end faces of the ball joint balls 20a and 20b opposite the shaft segments 14a and 14b. In practice, this thrust bearing is provided by nuts 26a and 26b screwed onto the threaded parts provided at the ends of the tension bar 24.

In the arrangement that has just been described, the tension bar 24 bears at each end on the balls 20a and 20b of the bearing block ball joints 12a, 12b that are fixed to the aircraft structure.

Furthermore, according to the invention, the support device 10a that supports the ball joint bearing block 12a is deformable. In particular, it may be a flexible or articulated partition. This has the advantage that the outer support device 10a can follow the displacements of the ball joint bearing block 12a imposed by the tension bar 24 without causing any uncontrolled bending phenomenon and therefore fatigue on the structure.

Thus, in the case in which the device is required to transmit axial forces towards the left in the FIGURE, in other words towards the outside of the aircraft when the ball joint bearing block 12a is the outer bearing block, the landing gear fitting bears on the ball joint of this outer bearing 12a and it transmits the said forces to it. Since the tension bar 24 bears on the ball joint 20a of this ball joint, it resists these forces and transmits them to the ball joint of the other bearing block 12b, and it also applies thrust to this other bearing block. The corresponding ball joint transfers forces to the inner support device 10b of the aircraft, through this second bearing block 12b. The axial displacement of the bearing block 12b due to elongation of the tension bar 24 and deformation of the inner support device 10b of the aircraft has no consequence on the said device since the support device 10b itself is deformable.

If the device has to transmit axial forces towards the right in the FIGURE, in other words towards the inner part of the aircraft when the ball joint bearing block 12a is the outer bearing block, these forces are transmitted to the inner support device 10b of the aircraft through the ball joint of bearing block 12b to which it applies a thrust, in this case the landing gear fitting.

Therefore the assembly device according to the invention is therefore capable of transmitting all axial forces to the inner support device 10b alone, fixed to the structure of the aircraft, regardless of whether these forces are in the direction towards the inside of the aircraft or towards the outside. Therefore these forces are not applied to the outer support device 10b, or only very slightly, depending on whether the support device 10a is articulated or flexible.

Furthermore, depending on the direction of the axial forces to be transmitted, only one of the two shaft segments 14a, 14b connected to the fitting of the landing gear bears on the balls 20a, 20b of the corresponding ball joint. Therefore, only compression forces are applied to this fitting and there are never any tension forces that could damage it.

Furthermore, since the tension bar 24 applies force at its ends onto the balls 20a and 20b of the ball joints of bearing blocks 12a and 12b and not directly onto the support devices 10a and 10b, the said tension bar is not subjected to a building-in moment at its ends when the aircraft structure deforms under the combined effect of axial and radial forces that could cause misalignment of the bearing blocks 12a and 12b. Therefore, the said misalignment is compensated by the pivoting movement of the ball joints, and the tension bar 24 housed on the inside of the shaft segments 14a and 14b follows the movements of these shaft segments, that themselves follow the movements of the balls 20a and 20b of the ball joints.

Advantageously, and also as illustrated in the single FIGURE, the guide rings 28a and 28b are installed in each end of the bearing liners 18a and 18b, in other words in their closest ends and in their furthest ends. The tension bar 24 is then installed with sliding adjustment on the inside of these guide rings 28a, 28b. This assembly enables the tension bar to turn freely around the shaft 16.

In the arrangement that has just been described, the guide rings 28a and 28b guide the tension bar 24 to limit the occurrence of vibrations. Furthermore, the functions to resist the radial and axial forces are clearly dissociated since two shaft segments resist radial forces while the tension bar alone resists axial forces. This limits friction forces during axial displacements at low load.

What is claimed is:

1. Landing gear assembly device on an aircraft structure, the device comprising two segments of the shaft aligned along the same center line and fixed to a fitting of the landing gear, two support devices fixed to the aircraft structure, two ball joint cages fixed in each of the said corresponding support devices, two ball joint balls installed in the ball joint cages and fixed to each of the corresponding shaft segments and a tension bar connecting the two support devices along the said center line, characterized in that one of the two support devices is deformable in the direction of the said center line and in that the tension bar connects these support devices through its end that bear on the bearing balls, exerting a tension force between these bearing balls.

2. Device according to claim 1, in which the deformable support device is offset towards the outside of the aircraft more than the other support device.

3. Device according to claim 1, in which the support device that is deformable is a flexible partition.

4. Device according to claim 1, in which the support device that is deformable is an articulated partition.

5. Device according to claim 1, in which the guide rings are fixed in the ends facing the two shaft segments and the tension bar is installed so that it is adjustable by sliding inside the said guide rings.

* * * * *